Feb. 14, 1933.  H. RÜHLEMANN  1,897,863
CONTACT DEVICE FOR TRANSFERRING ELECTRICAL
ENERGY INTO PROJECTILE IGNITERS
Filed June 30, 1932    9 Sheets-Sheet 1

Inventor:
Herbert Rühlemann
By [signature]
Attorney

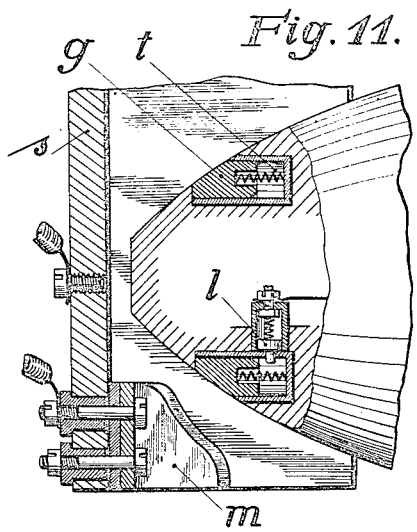
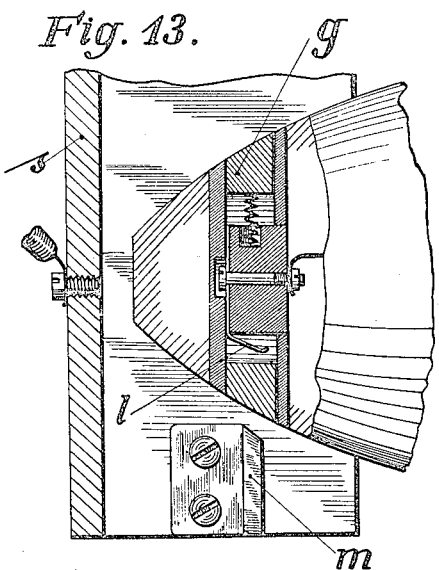
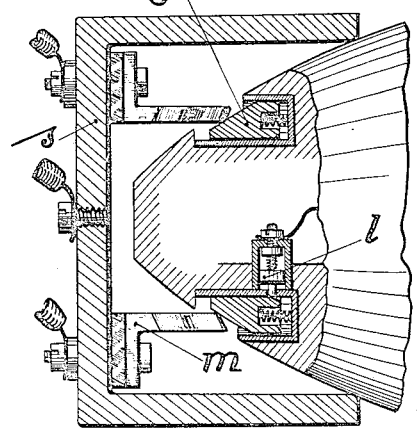
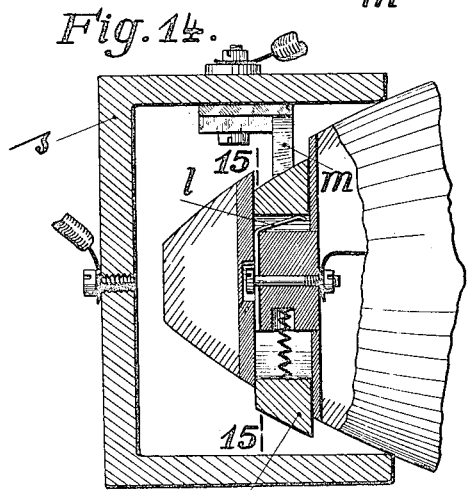
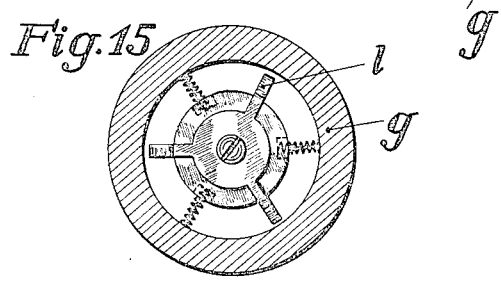

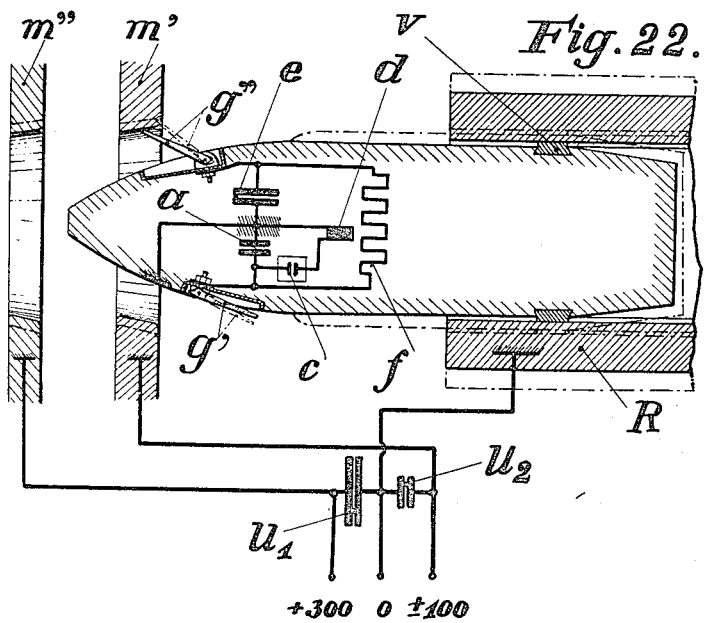
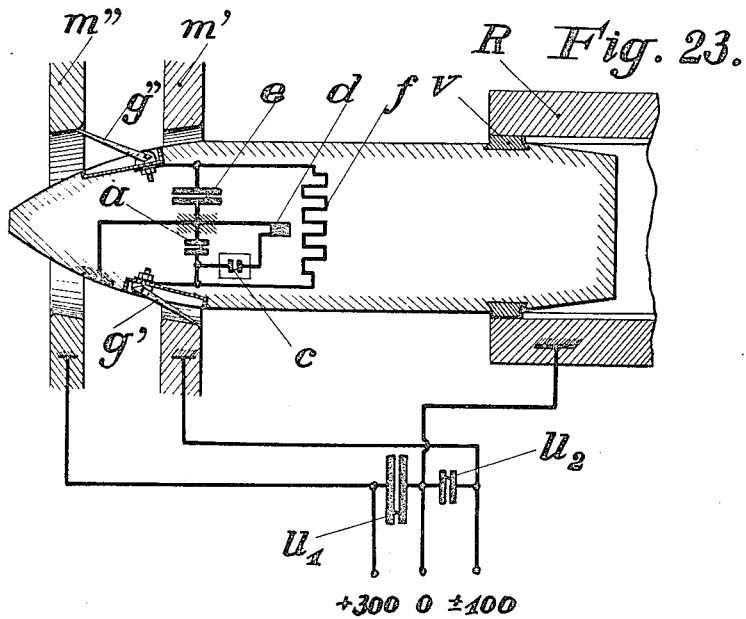

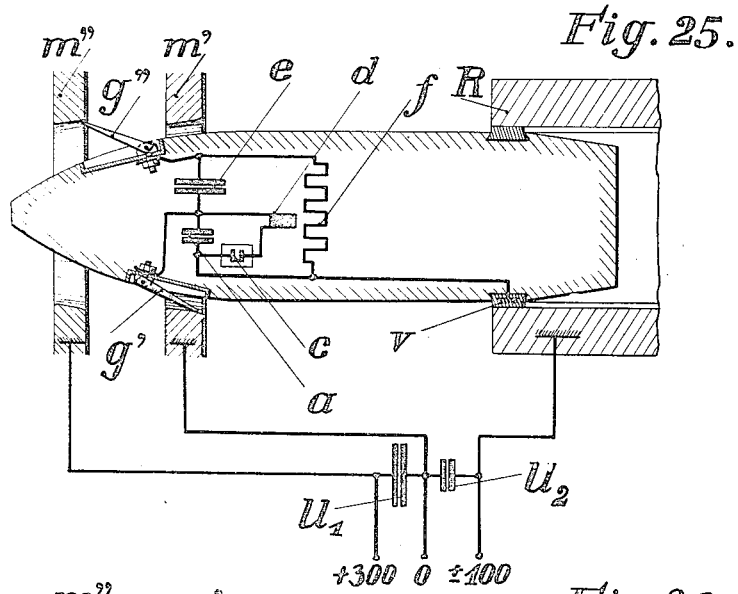
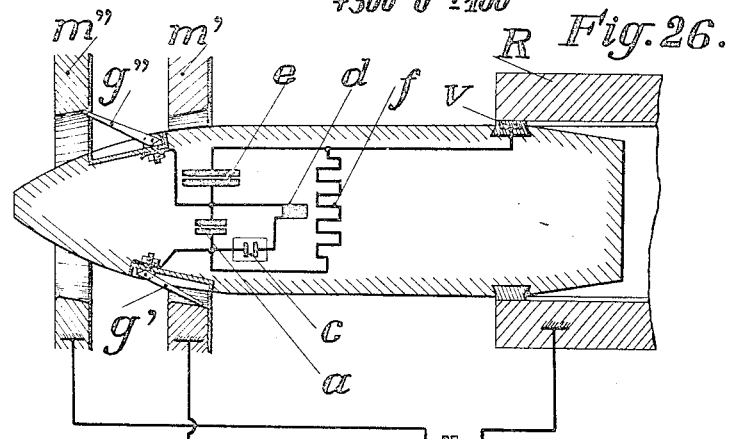
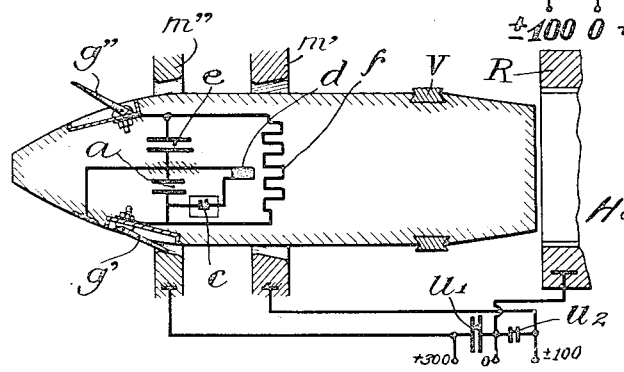

UNITED STATES PATENT OFFICE

HERBERT RUHLEMANN, OF SOMMERDA, GERMANY, ASSIGNOR TO RHEINISCHE METALLWAAREN- UND MASCHINENFABRIK, OF DUSSELDORF, GERMANY, A CORPORATION OF GERMANY

CONTACT DEVICE FOR TRANSFERRING ELECTRICAL ENERGY INTO PROJECTILE IGNITERS

Application filed June 30, 1932, Serial No. 620,236, and in Germany July 11, 1931.

It has already been proposed to introduce the electrical energy necessary, in electrical igniters for projectiles, for producing the ignition or for initiating such ignition, in the barrel of the gun only after the firing, when the projectile is in motion, by means of a charging device which is transiently allowed to act thereon. Thereby externally located contact elements of the igniter of the shell or projectile will slide past opposing contact elements on the gun barrel, preferably arranged in front of the muzzle thereof, which are supplied with a voltage from a source of electrical energy. In that case, however, a uniform production of contact with a plurality of firings is provided only if the igniter contacts do not merely lightly touch the contacts on the barrel, but when they project laterally, in their path, somewhat into the field of the contacts on the barrel. This in turn requires that the contact elements on the barrel and those located upon the igniter should be mounted yieldably with respect to one another, that is, movable toward and from one another in a direction transverse to the direction of motion of the projectiles, in order that they may pass one another without injury to the contacts on the barrel which are subjected to repeated use, and without any unfavorable effect upon the free flight of the projectile which ensues.

Known contact devices of this nature proposed for bomb throwing devices, wherein the contacts on the barrel are formed of springs projecting into the bore of the barrel and the path of the bomb guided therein, are very poorly adapted for guns. The springs located in the barrel are not adapted for the impact of the artillery projectiles which are discharged with high velocity and the action of the powder gases of the propelling charge; they are subjected to permanent changes in shape even after the first shot or the first few shots, by being bent out of shape or burnt, so that they no longer permit contact to be made with the contact of the subsequently fired shots.

These disadvantages are eliminated by the contact device in accordance with the invention, in that the means for providing the lateral and yieldable approach of the contacts on the gun barrel and on the projectile, in order to produce contacts between the same, is embodied in the energy receiving contact elements on the projectile, which are subjected to only one actuation. In accordance with the invention, the same are movably mounted upon the projectile and arranged as yieldable elements (slides, flaps or springs) extending into the field of the current-carrying opposing contacts of the charging device. The charging contacts on the barrel of the gun may now be arranged outside of the field of the enveloping surface of the projectiles which pass by the same, and formed as parts which are resistant and rigid per se, rigidly connected with their support and applied to the tube or barrel of the gun. They may advantageously comprise rings arranged around the bore of the gun or the projection thereof, and of an internal diameter slightly larger than the calibre of the gun.

The igniter contact elements which are movably arranged on the projectile radially or tangentially to the axis of the projectile, may be initially brought into their contact producing position by means of spring tensioning (intrinsic resilience, or additional springs) or may be made convertible into such. Preferably an arrangement is used wherein, in the shipping condition of the projectile body, they are so mounted in hollows or cavities of the said body that they lie upon or within the outer limiting surface of the same, and automatically shift outward into the contact position only after firing off the projectile, upon passing the contact elements arranged on the gun barrel. In the case of drawn tubes, it suffices to arrange the contacts on the projectile as centrifugal force elements, in order to produce this motion. The positioning or storage of the same can further be so arranged that after passing the contacts on the barrel, during the ensuing free flight of the projectile, they will either remain in their position projecting from the projectile—which due to the small dimensions of the contacts, has no disturbing influence whatever upon the movement of the said projectile—or may be thrown away, out of the projectile. Means may also be provided which will permit the contacts on the projectile to extend out of the casing of the projectile only transiently during the acceleration period, in which the passage of the projectile past the contacts on the barrel of the gun takes place, and thereupon to again draw them back under the said casing.

The contact device in accordance with the invention, aside from being suitable for igniters for artillery projectiles, which leave their guide track (the bore of the gun) in the direction of their longitudinal axis, are suitable also for providing the energy for the igniters of thrown projectiles (bombs) and especially for those which, stacked one above the other in a magazine, are thrown off laterally.

The provision of a plurality of current conveying opposing contact elements on the charging device, at various distances transversely to the guide track of the projectiles, also makes it possible to feed different kinds of energy simultaneously and with certainty at the proper place, into an igniter provided with a plurality of energy storing means.

The drawings show a plurality of embodiments of contact devices in accordance with the invention, for transferring energy into electrical igniters for artillery projectiles and throwing-bombs during the movement of the projectiles after the firing or after the throwing, upon leaving the guide track.

Figure 9:
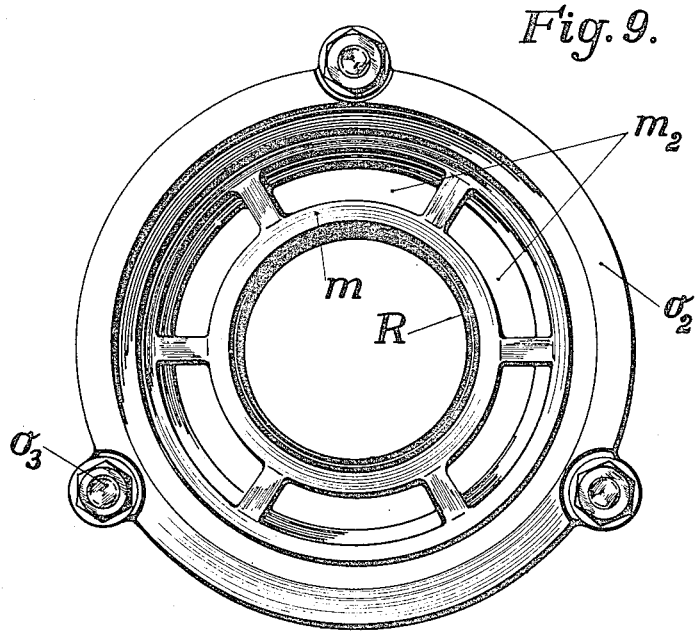
Figure 10:
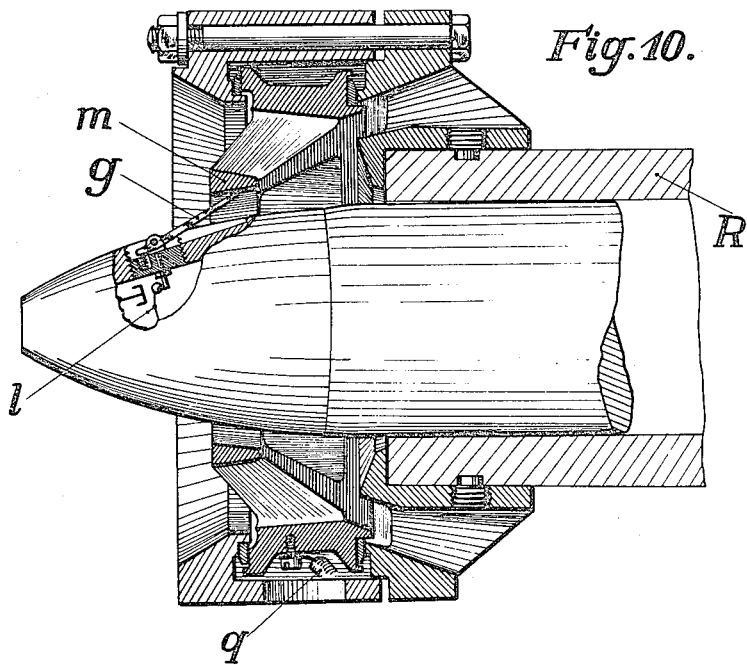

Fig. 9 the same in front elevation;

Fig. 10 shows the cooperation of the contact elements on the projectile igniter with the charging elements on the gun barrel;

Figs. 11–15 show contact devices for the igniters of bombs which are thrown laterally; and Figs. 16–26 show such contact devices for transferring various energies simultaneously into one igniter.

As an example of an electrical igniter into which electrical energy is to be introduced by means of the contact device, in accordance with the invention, there has been chosen an example wherein electrical condensers are employed to store the ignition electrical energy. As shown by the diagram of connections in the projectiles, according to Figs. 1 and 2, of the electrical igniting device, the same comprises two condensers. An igniting condenser $a$ can deliver the energy introduced thereinto, as an igniting current through a percussion-closed contact $b$ or a discharge tube $c$ acting as an automatic time switch, to an igniting means $d$ in order to fire the same. A storage condenser $e$ will feed the necessary energy to the condenser $a$ only gradually, through a high ohmic resistance $f$, that is, with a certain delay after it is itself charged, and thereby causes said igniter to be prepared for a subsequent percussion ignition, as well as for a time ignition, only after a certain safety time interval has elapsed.

Contact elements $g$ projecting from the casing of the projectile or coming forth from the same only at definite moments, serve to introduce the electrical energy into the storage condenser $e$. These form the intermediate connecting elements with one pole of a source of current separated from the projectile. As the second conductor from the source of current to the storage condenser $e$, use is made of the body of the igniter itself, which is conductively connected with one coating or armature of each of the two condensers $e$ and $a$.

Figure 1:
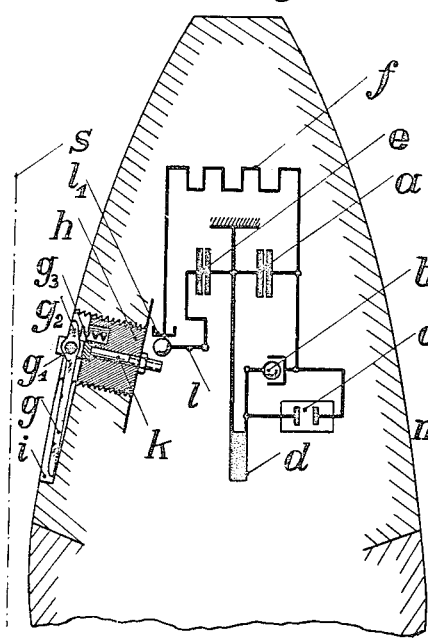
Figs. 1–7 show examples of the current-receiving contacts arranged on projectile igniters.
Figure 2:
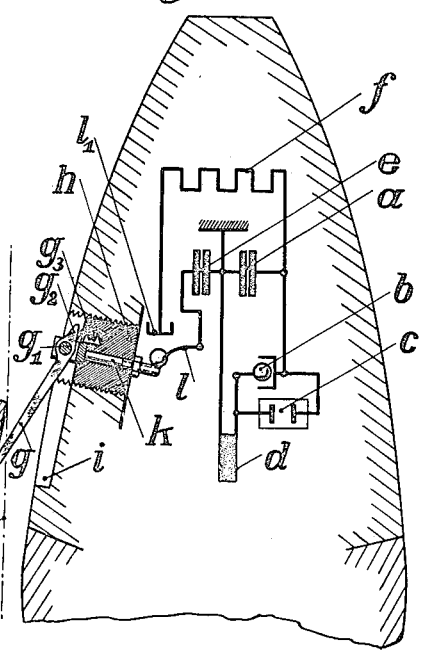
Figure 3:
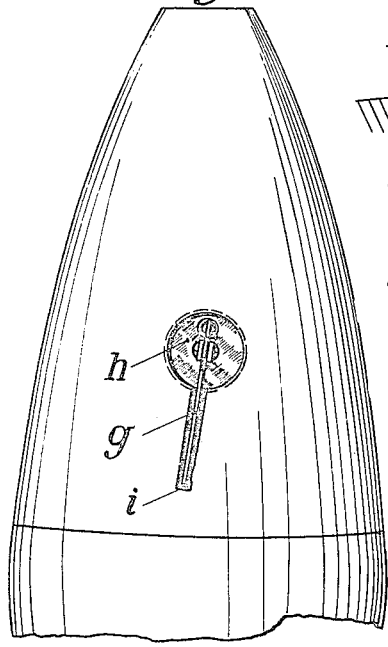

In accordance with Figs. 1–3 the current receiving projectile contact element $g$ consists of a rigid lever which can swing out radially to the axis of the projectile about the pin $g_1$, which lever is mounted in a mass $h$ of electrically (insulating) non-conducting material screwed into the wall of the forwardly-tapering body of the igniter. A spring $g_3$ presses from the inside against a forwardly extending lug $g_2$ of the contact lever $g$, and holds the same folded down into a groove $i$ of suitable depth cut in the body of the igniter, so that in the shipping condition of the projectile it will lie within the surface of the casing thereof. A resilient inertia contact element $l$ may come into contact with the rear end of the securing bolt for the fork-like metallic bearing portion $k$ of the contact lever $g$, said contact element $l$ being conductively connected with one coating of the storage condenser $e$, normally, however, out of contact with the bearing portion $k$ of the contact lever $g$ by being connected to a contact element $l_1$ leading to the resistance $f$, thereby holding the igniting condenser $a$ joined to the storage condenser $e$.

Due to the centrifugal force produced by the rotation of the projectile after firing, the contact lever $g$ will swing out of its position within the surface of the casing (Fig. 1) of the projectile, radially outward with respect to the axis of the projectile to such extent that it will project into the field (indicated by the line S in Fig. 1) of a current-carrying opposing contact element of the charging device arranged a slight distance from the outer surface of the casing of the projectile. This position of the contact lever $g$ and the contact produced thereby with the opposing contact element $m$ of the charging device is shown in Fig. 2. At the same time it may be seen from the same how the inertia-switch $l$, as a result of the acceleration of the projectile, has come into contact with the bearing pin $k$ of the contact lever $g$, while disconnecting the ignition condenser $a$ from the storage condenser $e$, and has thus connected the condenser $e$ with the source of charging current by connecting the said storage condenser $e$ to the contact lever $g$.

The bearing pin $g_1$ serving as the axis about which the contact lever $g$ swings, may be arranged to cross the longitudinal axis of the projectile transversely, so that the contact lever $g$ itself will extend parallel to the axis of the projectile. It is advantageous to have the bearing pin $g_1$ extend at an inclination to the longitudinal axis of the projectile equal to the angle of rifling of the bore of the gun, and thereby cause the contact lever $g$ itself to extend in the direction of travel of the projectile surface, as shown in Fig. 3. In that case, during the acceleration period of the projectile, in which the swinging out of the contact lever $g$ for producing contact with the opposing contact element $m$ of the charging device occurs, no frictional resistances, due to the rotation of the projectile, will be produced between the abutting or adjacent bearing and limiting surfaces of the contact lever $g$ and the igniter body. The contact lever $g$ may swing out unobstructed and most rapidly into its contact-producing position, under the influence of the centrifugal force.

Figures 4, 5:
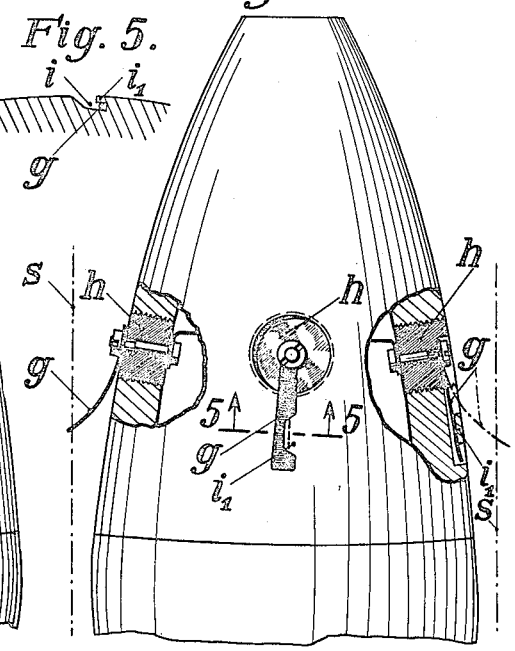

Fig. 4 shows two embodiments of projectile contact elements $g$ with inherent resilience. In accordance with the embodiment shown at the left, the contact element $g$ consists of a piece of spring wire secured to the insulating body $h$, which is initially arranged with its free end bent to extend into the field (line S) of the current-carrying opposing contact element of the charging device. The swinging out of this contact $g$ which is then bent back radially somewhat upon passing through the barrel of the gun, into its contact-producing position after leaving the muzzle of the gun, due to the centrifugal force, is further assisted by the intrinsic resilience.

In the embodiment shown at the right hand side of Fig. 4 in lonigtudinal section and shown centrally in plan view, the free end of the contact spring $g$ in the shipping condition of the projectile is arranged to lie in a pushed-back condition in a slot $i$ of the igniter within the outer surface thereof, in contrast to the unelectrified position thereof (shown in dotted lines) projecting beyond the casing wall of the projectile. It is retained therein by a projection $i_1$ of the igniter body (Fig. 5), which partly covers the slot $i$. The slot $i$, upon the side lying opposite to the retaining projection $i_1$, runs in an inclined direction into the outer wall of the casing of the projectile, which upon acceleration of the rotation of the projectile (assuming right hand rifling) allows the contact spring $g$, which is retained under the projection $i_1$, to move forward to the left beneath the projection $i_1$ and thereupon to swing outwardly in radial direction in order to produce contact with the opposing contact element of the charging device.

Figure 6:
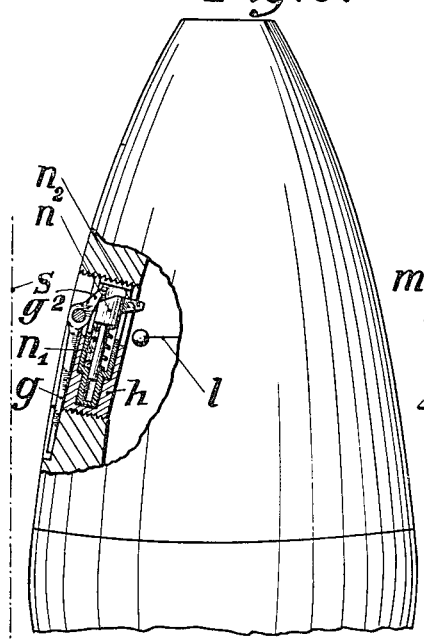
Figure 7:
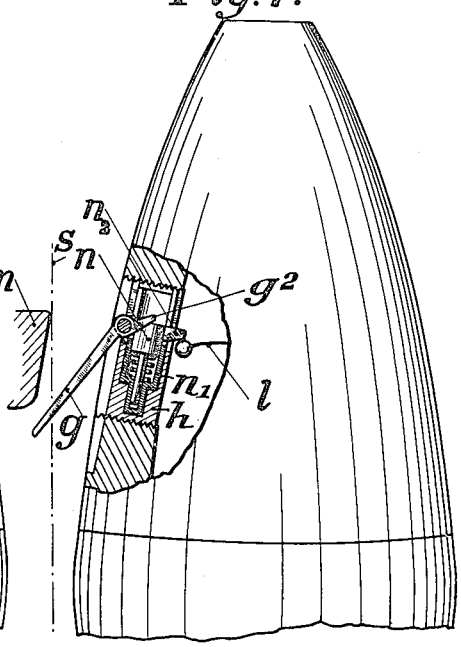

In the embodiment, according to Figs. 6 and 7, a rigid contact lever $g$ is retained in its position within the outer wall surface of the casing of the igniter body by means of an inertia latch $n$, which is shiftably mounted in the longitudinal direction of the projectile in the insulating member $h$, and by means of its outer surface prevents a forward projection $g_2$ on the contact lever $g$ from moving inwardly into the interior of the igniter body, and thereby prevents the contact lever $g$ itself from swinging outwardly. A spring $n_1$ retains the security latch $n$ in this locking position. Upon firing, the safety latch $n$ will move to the rear, due to its inertia, tensioning the spring $n_1$ and thereby affords room for the lug $g_2$ of the contact lever $g$ to swing in. The contact lever $g$ is then capable of moving outwardly into the field (line S) of the opposing contact element of the charging device. Simultaneously therewith a projection $n_2$ on the safety latch $n$, has closed a hitherto interrupted connection between the contact lever $g$ and the storage condenser $e$, by becoming positioned against a yieldable contact element $l$ leading to the storage condenser $e$ (Fig. 1). After the termination of the acceleration of the projectile shortly after the passage of the contact lever $g$ past the opposing contact element of the charging device, the spring $n_1$ again pushes the safety latch $n$ forward. The latter brings the lever $g$ itself out of its outwardly-swung position, by pressure of the projection $g_2$ on the inwardly-swung contact lever, back into that position (Fig. 6) in which it is retracted into the outer casing wall of the igniter body. For the further flight of the projectile, the smooth outer shape of said projectile is thus again established anew, and no projecting parts, which would injure the flight of the projectile, are present. Furthermore, the contact lever $g$ has again been disconnected from the storage condenser of the igniter, by the moving forward of the safety latch $n$.

The cavities $i$ in the igniter body, which accommodate the movable contact elements in their shipping position, may have strips of paper pasted over the same or may be covered with a readily fusible or combustible substance located in the open joints between their walls and the contact elements, which prevent the entrance of foreign substances during storage and in shipping, and thereby prevent injuries to and jamming of the contact elements and which are removed, upon firing, either by the propelling gases or by the contact elements themselves when swinging outward.

Figure 8:
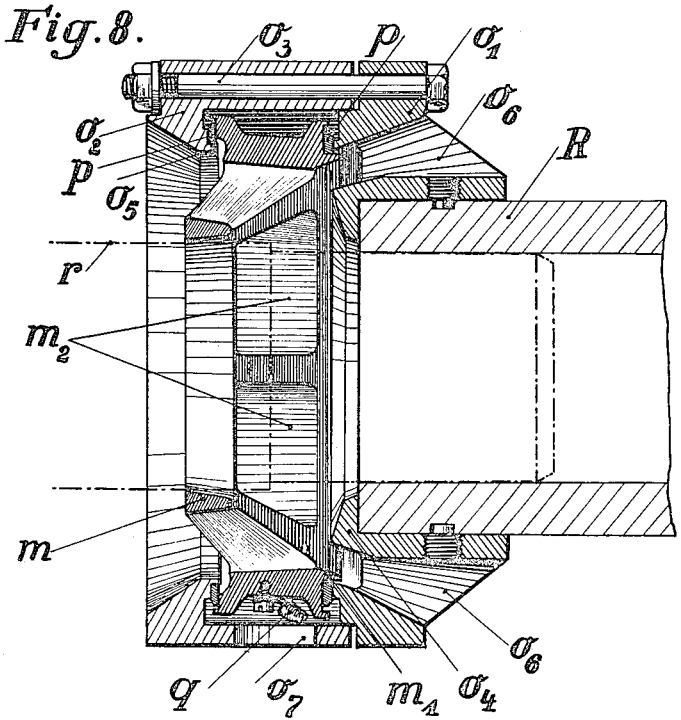
Fig. 8 shows, in longitudinal section, a contact arrangement of the charging means located in front of the muzzle of the gun.

The opposing contact element $m$ of the charging device, in the embodiment shown in Fig. 8, consists of a ring arranged in front of the muzzle of the gun tube R, the inner surface of which, narrowing slightly from rear to front, has, at its narrowest portion, a diameter somewhat larger than the calibre of the gun. The contact ring $m$ is secured between two members $o_1$ and $o_2$ arranged in front of the muzzle of the tube, one of which, inserted upon the muzzle of the tube, carries the other one which is secured thereto by means of screw bolts $o_3$. Insulating intermediate inserts $p$ are located between the bearing surfaces of the contact ring $m$ and the opposing surfaces of the members $o_1$ and $o_2$. These are extended in radial direction beyond the direct field of the stream of gas discharging from the muzzle of the tube, and safety projections $m_1$, $o_4$ and $o_5$ on the contact ring $m$ and its supporting parts $o_1$ and $o_2$, in cooperation with perforations $m_2$, $o_6$ and $o_7$ in these parts, forming gas deflecting passages, prevent a pressure effect of the propelling gases upon the insulating intermediate layers $p$. This arrangement diverts injurious effects of the propelling gases to a distance from the insulating layers $p$ and serves with certainty to prevent short circuits between the contact ring $m$ which is connected through the conductor $q$ with one pole of a source of current and the barrel R of the gun which is connected with the other pole of the source of current.

An exact centering of the contact ring $m$ with respect to the bore of the tube is made possible by a predetermined slight radial play between the projections $o_5$ of the supporting element $o_2$, serving as retaining means in a radial direction, the intermediate insulating member $p$ and the opposing surfaces of the contact ring $m$. After assembling these parts and inserting the screw bolts $o_3$, a gaging plug $r$, shown in Fig. 8 in dot and dash lines, is inserted through the contact ring $m$ into the bore of the gun. The contact ring, thus centered, is then clamped tightly between the two supporting parts $o_1$ and $o_2$ by tightening up the screw bolts $o_3$, and maintains this adjusted position upon subsequently being used in firing.

The introduction of energy into a projectile which has been fired off, occurs within the time interval during which the movable contact element $g$ of the igniter, which is swung radially outward, brushes past the contact ring $m$ of the charging device (Fig. 10). The circuit between the energy-carrying means of the igniter and the source of current of the charging device is thereby closed through the second connection existing simultaneously therewith: energy-carrying device—the body of the projectile—the gun barrel—and the source of current.

Figs. 11-15 show contact devices in accordance with the invention, for transferring electrical energy into throwing-projectiles (bombs, grenades) which fall out of the throwing device, for example, a magazine, in the direction of their longitudinal axes. The projectiles (a plurality stored one above another) are mounted and guided with their head and rear ends in rails $s$ of U-shaped cross section. The electrical igniters are of the kind shown, in greater detail, in Fig. 1. One pole of the energy-carrier of the igniter of the projectile is connected with one pole of a source of current through the body of the projectile and the guide rail $s$. A ring $g$ which is movably mounted in the head of the projectile forms the contact element for connection with the second pole of the source of current.

In the embodiment in accordance with Fig. 11, (longitudinal section through the guide track of the projectile), and Fig. 12 (cross section), this contact ring $g$ is mounted in the head of the projectile so as to be shiftable from a forward position, whereby the outer surface thereof which is made to conform to the shape of the surface of the casing of the projectile, is mounted to coincide with the latter, and is shiftable to the rear against the tension of a spring, in an insulated intermediate space $t$. Normally the contact ring $g$ is located with its forward end surface abutting against an annular projection of the point of the projectile and is at the potential of the body of the igniter. The connection between it and the energy-carrier of the igniter is interrupted.

Within the guide rail $s$ there are secured two insulated opposing contacts $m$ of the charging device, connected to the second pole of the source of current, the fastening being such that they protrude with inclined surfaces into the path of the contact rings $g$ of the projectiles which are guided within the rail $s$. Upon the sliding-out of a projectile which falls after releasing its securing device, out of the guide rail $s$, its contact ring $g$ will abut against the inclined surfaces of the opposing contact members $m$ and thereby is shifted rearwardly with respect to the igniting body, in the direction of the longitudinal axis of the projectile. The forward end surface of the contact ring $g$ will come out of contact with the body of the igniter, the contact ring $g$ is now insulated with respect to the latter and presses with its inner casing surface upon a spring bolt $l$ which is in electrically conductive connection with the energy-carrier of the igniter. Thereby the electrical circuit between the energy-carrier of the igniter and the source of charging current is provided through the body of the igniter and the guide rail $s$, on the one hand, and the contact ring $g$ and the opposing contact elements $m$, on the other hand. The igniter becomes charged. After passing the opposing contact elements $m$ of the charging device, the contact ring $g$ of the projectile, due to the spring tensioning, will again assume its forward end position in the head of the projectile, wherein it is disconnected from the energy-carrier of the igniter.

In the embodiment in accordance with Figures 13–15, a contact ring $g$ which is insulatedly mounted in the head of the projectile, is mounted to be movable out of a central position, wherein its outer casing surface forms a continuation of the head of the projectile, in a radial direction against a spring action in all directions. It cooperates with a stationary opposing contact member $m$ at the discharge end of the guide rail $s$, which projects from one side of the projectile into the path of the contact ring $g$ and transiently forces the same in radial direction toward the opposite side while the projectile is passing. Thereby the inner casing surface of the projectile ring $g$ comes into contact with a contact spring $l$ which is connected with the energy-carrier of the igniter, and the igniter becomes charged. The provision of at least three contact springs in the cavity of the resiliently movable contact element $g$ of the projectile around the axis of the igniter, in accordance with Figure 15, provides with certainty for the connection of the ring $g$ with the energy-carrier of the igniter in every possible turned position of the projectile about its longitudinal axis in the guide rail and the radial shifting of the contact ring $g$ to any side whatever of the projectile produced thereby.

The contact devices in accordance with Figures 16–27 serve for the simultaneous introduction of various kinds of energy into one and the same projectile. They are applicable in projectiles having a plurality of igniting devices operating independently of one another with energies of various magnitudes, or they may be used for electrical time igniters as timing auxiliaries, in order to make the smallest possible range of voltages suffice for all the times of travel of the projectile, as well as to make it possible to control the times of ignition more accurately.

The contact devices which are illustrated serve the latter purpose. In Figures 16–21, the projectile igniter is an electric double igniter of the type represented in Figure 1, having a storage condenser $e$ and an ignition condenser $a$, which can deliver the energy imparted thereto with delay through a high ohmic resistance $f$, through a percussion-closed switch $b$, or a discharge tube $c$ connected in parallel thereto, in order to ignite an electrical igniting agent $d$. In the previously mentioned embodiment in accordance with Figure 1, only the storage condenser $e$ is charged from a source of current separate from the projectile, by means of the contact arrangement in accordance with the invention, upon leaving the muzzle of the gun after firing. The magnitude of the voltage impressed upon the storage condenser there operated in conjunction with the magnitude of the resistance $f$ between the two condensers $e$ and $a$ to provide a gradual growth of a voltage in the igniter condenser $a$ up to the ignition voltage (breakdown voltage) of the discharge tube $c$ in the ignition current circuit $a$—$d$ after a very definitely determined time (which is longer or shorter, according to whether charged to a lower or higher voltage). Thereby the point of ignition is also determined. In order to keep the total necessary range of charging voltages small, however, preferably a certain voltage is introduced not only into the storage condenser $e$, but simultaneously also into the igniter condenser $a$, upon leaving the muzzle of the gun, which then by the subsequent transfer of energy from the storage condenser is finally brought to the voltage necessary for igniting the igniting agent $d$ and for striking through the discharge tube $c$.

For this purpose the igniters in accordance with Figures 16–19 each have two movable contact elements $g'$, $g''$, in the form of rigid levers, of the type illustrated in Figures 1 and 2. The contact element $g'$ corresponds to the ignition condenser $a$, and the contact element $g''$ corresponds to the storage condenser $e$. Two opposing contact elements $m'$, $m''$ of the charging device cooperate with the movable contact elements $g'$, $g''$ of the projectile, said opposing contact elements being arranged in front of the muzzle of the gun, rigidly connected therewith, and arranged a definite distance in front of one another, constituting the annular contacts which surround the continuation of the bore of the gun. Their contact-providing inner surfaces are located at various distances $x'$, $x''$ from the guide track of the projectile (indicated by the dot and dash line F) in the transverse direction and indeed in the embodiments illustrated the contact rings follow one another in step fashion in such manner that the projectile on passing by the same will first reach the contact element $m'$ thereof, whose contact-providing inner surface lies closest in a transverse direction to the guide track of the projectile at the distance $x'$.

Normally, that is, in the shipping condition of the projectile, the movable contact elements $g'$, $g''$ of the projectile are disconnected from the igniter condensers $e$ and $a$. Upon brushing through the opposing contact elements $m'$, $m''$ of the charging device, a conductive electrical connections is automatically established between $g'$ and $a$, or $g''$ and $e$. This occurs in the embodiment in accordance with Figures 16 and 17 by means of inertia contact members $l'$, $l''$ arranged in the connecting conductor leading through the high ohmic resistance $f$ between the two condensers. These inertia contact members $l'$, $l''$ during the acceleration period of the projectile, swing back in the body of the igniter, due to their inertia, and thereby while simultaneously opening the connecting conductor of the condenser, will set up the connection between the contact element $g'$ and the igniter condenser $a$, as well as between the contact element $g''$ and the storage condenser $e$.

Figure 18:
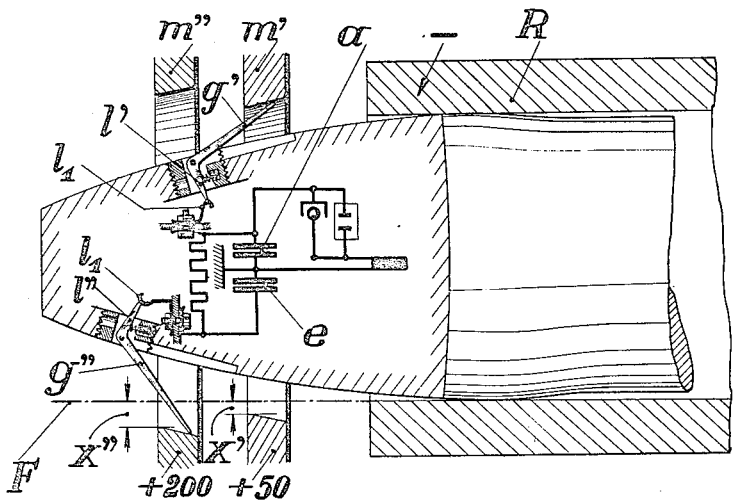
Figure 19:
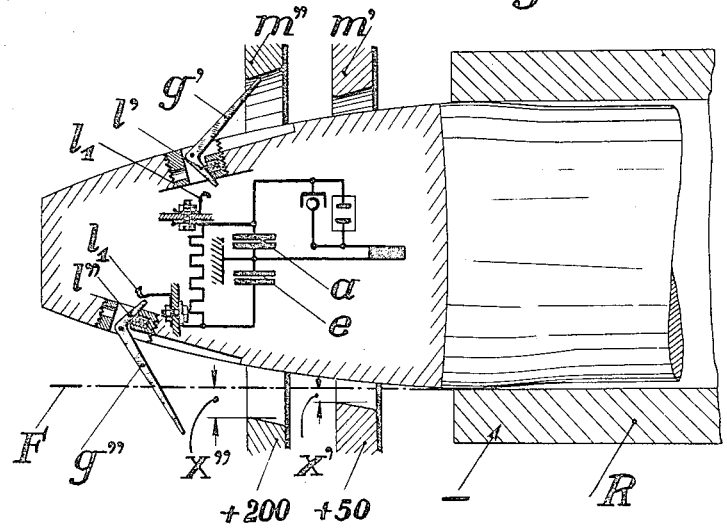

In the embodiment in accordance with Figures 18 and 19, lugs $l'$, $l''$ upon the contact levers $g'$, $g''$ projecting into the interior of the igniter, upon swinging outward after leaving the muzzle of the gun, come into contact with opposing contact springs $l_1$, which are connected to one coating of the igniter condenser $a$, or the storage condenser $e$.

In the embodiments illustrated herein it is assumed that during the passing of the projectile through the contact elements of the charging device, in order to attain a definite time of ignition, that the contact element $m'$ lying nearest to the muzzle of the gun is charged to a voltage of $+50$ volts, the second contact element $m''$ being at a voltage of $+200$ volts. The barrel of the gun is connected to the negative terminal of the source of current. The storage condenser $e$ of the igniter is to have a voltage of 200 volts imparted thereto, the ignition condenser $a$, in order to more rapidly attain the voltage necessary for breaking through the tube $c$, is initially to be given a voltage of 50 volts.

Figure 16:
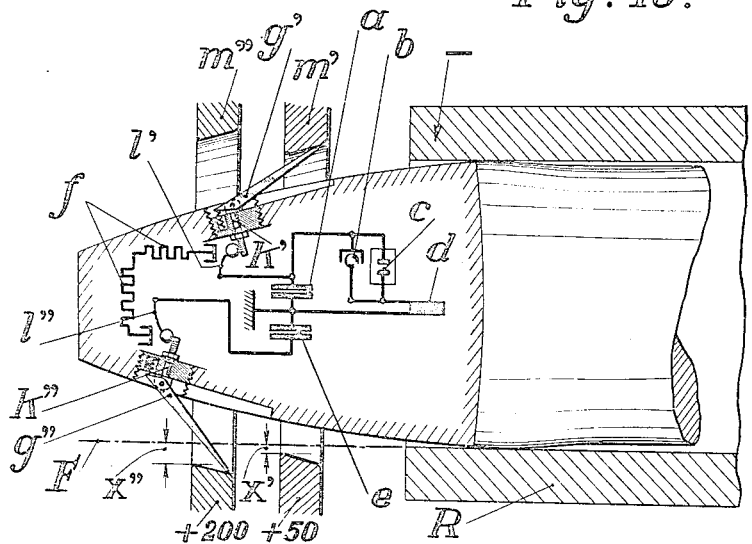
Figure 17:
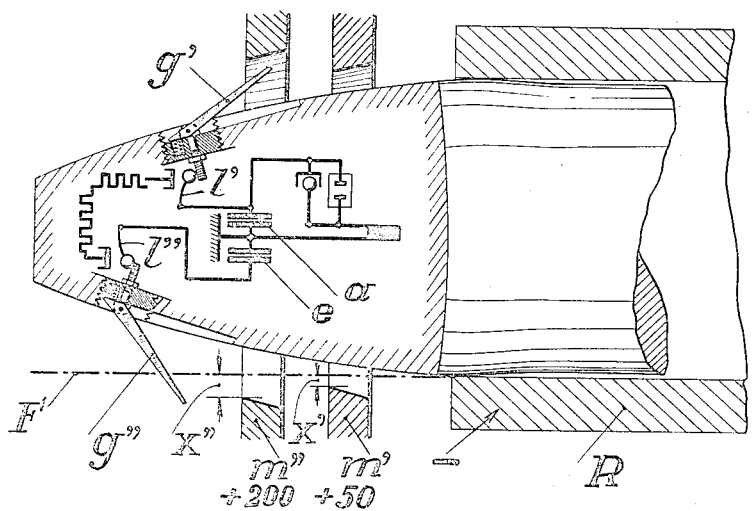

Now in order that the energies provided from the opposing contact elements $m'$, $m''$ of the charging device may be introduced in the correct manner and at the proper place into the igniter, in the embodiment in accordance with Figures 16 and 17, the contact elements $g'$, $g''$ of the projectile are arranged to be movable out of the body of the projectile in such restricted manner, that each of them, upon passing the opposing contact elements $m'$, $m''$ of the charging device, will make contact therewith as the last one, which provides the energy which is to be introduced into the igniter by this particular contact. The contact element $g'$ which corresponds to the igniter condenser $a$ is capable of swinging out only to such extent that upon passing through the first opposing contact ring $m'$ of the charging device it touches the inner surface thereof (Fig. 16), however, upon passing through the second opposing contact ring $m''$ it does not reach the inner surface thereof (Fig. 17). It therefore introduces the desired voltage of 50 volts into the igniter condenser $a$. The second contact element $g''$ of the projectile, upon passing through the charging contacts will first come in contact with the narrower contact ring $m'$, thereby introduces the voltage of 50 volts carried by the latter into the storage condenser $e$, and upon its further brushing past the second contact ring $m''$, increases this voltage to the voltage of 200 volts carried by the latter. After the cessation of the acceleration of the projectile, the inertia contact elements $l'$, $l''$ swing back into their forward position, in which furthermore, while disconnecting the contact elements $g'$, $g''$ of the projectile, from the condensers $e$ and $a$, they connect the latter to one another through the resistance $f$, so that the transfer of energy from the storage condenser $e$ into the igniter condenser $a$ may commence.

In the contact arrangement on the projectile in accordance with Figures 18 and 19, an incorrect introduction of the voltages carried by the two contact rings $m'$, $m''$ of the charging device into the igniter condensers is prevented by the switches formed of the lugs $l'$, $l''$ of the contact levers $g'$, $g''$ in combination with the opposing contact springs $l_1$. After the projectile has passed through the charging contacts, these again switch off the contact levers $g'$, $g''$ from the condensers, upon swinging out further. For this purpose the lever ratios of $g'$ and $l'$, or of $g''$ and $l''$, are so proportioned and the contact springs $l_1$ are arranged in such positions, that the switch $l'$, $l_1$ is closed only for such period as the lever $g'$ has extended with its free end in the region of the inner surface of the first contact ring $m'$ of the charging device. On the contrary the switch $l'$, $l_1$ is opened, when the contact lever $g'$ in the shipping condition of the projectile is folded into the casing surface of the head of the projectile or when upon brushing through the second contact ring $m''$ of the charging device (Fig. 19) it has come into contact with the inner surface thereof. The second switch $l''$, $l_1$ is closed only when and as long as the contact lever $g''$ is swung out into the field of the inner surface of the forward opposing contact element $m''$ of the charging device.

Preferably, in projectiles with two or more movable contact elements cooperating with various opposing contact elements of the charging device, as shown in Figures 16–19, the latter are arranged in such manner, staggered with respect to one another, that they all simultaneously reach the opposing contact elements of the charging device cooperating with the same, and the introduction of the various energies into the igniter takes place simultaneously.

Figure 20:
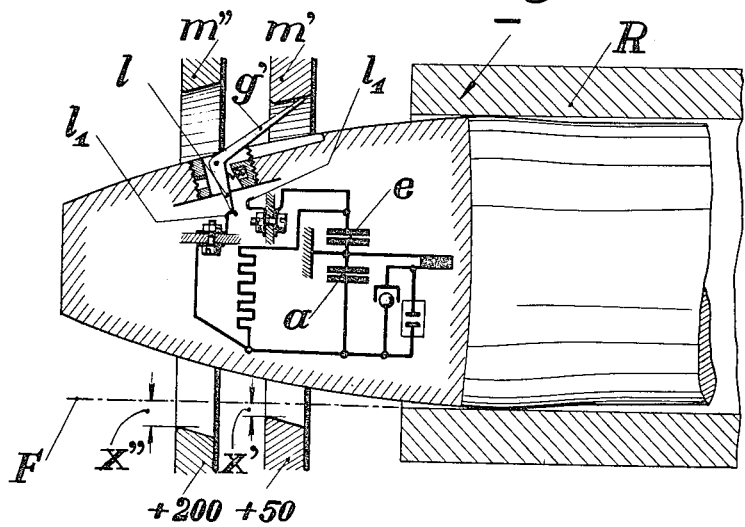
Figure 21:
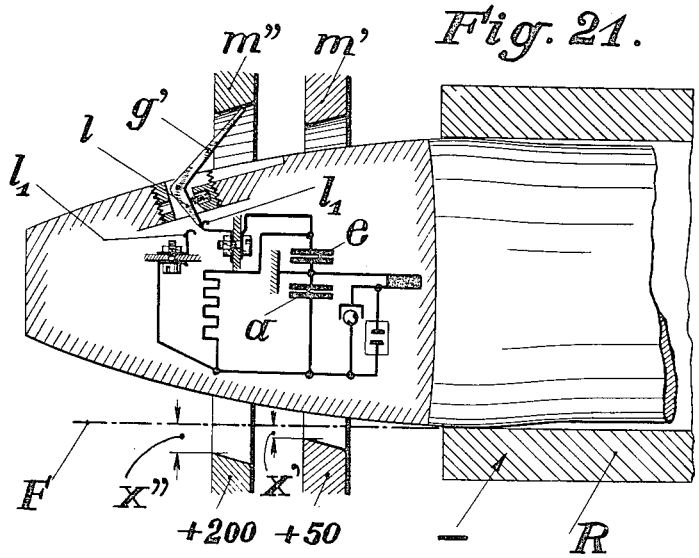

In the contact arrangement in accordance with Figures 20 and 21, the distribution of the diverse voltages carried by the two opposing contact elements $m'$, $m''$ of the charging device to the various portions (ignition condenser $a$ and storage condenser $e$) of the projectile igniter is accomplished by means of a single movable contact element $g$ on the projectile. The latter, after leaving the muzzle of the gun, comes successively into contact with the two opposing contact elements $m'$, $m''$ of the charging device and in each individual production of a contact is connected successively with various contact springs $l_1$ by means of a projection or lug $l$ which springs into the interior of the igniter, and is thereby connected at each instant with that energy-carrier (igniter condenser $a$, storage condenser $e$) to which the energy provided by the contact element $m'$ or $m''$ which is at that moment being contacted, is to be provided.

The contact devices in accordance with Figures 22–26 likewise serve for simultaneously introducing various electrical energies into a projectile igniter which is provided with a plurality of energy-carriers, and which itself is divided into three different embodiments of connections or circuits of its internal electrical structure. Whereas in the previously described contact devices of this type, the individual electrically "live" contacts on the gun were arranged at varying distances from one another in a direction transverse to the guide track of the projectiles, in order to correctly introduce all the energies simultaneously into the igniter at the proper places and in connection therewith the contacts on the projectile were mounted either so as to be movable out of the body of the projectile to an exactly limited extent or so as to shift switches when projecting to various extents, such switches lying in the charging current circuits of the energy-carriers of the igniter, in the embodiments in accordance with Figures 22–26, in order to make certain of the correct introduction of energy, use is made of a correlation of the mutual positions of the current-carrying contacts on the gun and the current-receiving contacts on the projectile, in the direction of the path of the projectile, that is, along the latter. The contact elements $m'$, $m''$ or $g'$, $g''$ are arranged in their supports—on the gun R and on the projectile—following one another at such intervals at each pair of contacts on the projectile, $g''$—$v$, or $g''$—$g'$, Fig. 22, belonging to an energy-carrier $e$ or $a$ in the projectile and connected with the two poles thereof, finally becomes simultaneously connected with that pair of contacts on the gun, $m'$—R, or $m''$—$m'$, which furnishes the energy intended for the contemplated energy-carrier $e$ or $a$ of the projectile. Contact elements located further forward on the gun, for example $m''$, are then brushed past by the pairs of contacts on the projectile (for example, $g''$—$v$), for which they are not intended, so as now to provide only a single contact, and there is produced thereby at most merely a unipolar connection of the energy-carrier (for example, $e$) of the igniter to the source of charging current ($w_2$), which leaves the energy previously acquired by an energy-carrier unchanged. This arrangement gives the advantageous possibility of making it possible to employ one and the same igniter for projectiles of various calibers, whereas this was not possible without additional means in the embodiments of the contact arrangement in accordance with Figures 16–21. In said case it was necessary to at least make the current-receiving elements of the igniters different for each caliber of the projectile, in order that they might cooperate in the correct manner with the contact element of the gun corresponding thereto. The contact elements of the gun may now advantageously be constructed as rings of the same internal diameters.

Figures 22–24 of the first embodiment show the projectile upon leaving the muzzle of the gun, in various phases of its cooperation with the contacts of the gun during the transfers of energy into the igniter. This for example is a simple time igniter and the basic principle of its electrical arrangement is similar to those disclosed in the previously mentioned embodiments. It contains a storage condenser $e$ and an ignition condenser $a$. The latter is gradually charged by the storage condenser $e$, during the flight of the projectile, to a voltage, which upon increasing to the magnitude of the break-down voltage of the discharge tube $c$ located in its discharge circuit, after a previously determined time causes the ignition of the electrical igniting agent $d$ likewise arranged in series therewith, and thereby causes the projectile to explode. Two different energies are simultaneously supplied to the projectile igniter, which for instance are provided from two condensers $U_1$, $U_2$ on the gun, which have one coating of each of them connected together by a conductor. One condenser, for example $U_1$, may have a voltage of plus 300 volts, which is intended for the storage condenser $e$ of the igniter; the second condenser $U_2$ is charged to voltages of various magnitudes, in order to attain the desired time of travel of the igniter, said voltages varying say between plus and minus 100 volts. The voltage thereof is intended for the igniter condenser $a$ of the igniter. The coating of the condenser $U_1$ which is charged to the voltage of plus 300 volts is connected with the forward contact $m''$ of the gun; the coatings of the two condensers $U_1$ and $U_2$ which are at the zero potential, are connected to the barrel R of the gun, whereas the second coating of the condenser $U_2$, which carries a voltage varying between plus and minus 100 volts, is connected with the rearward contact ring $m'$ of the gun. The projectile has two contact levers $g'$, $g''$, the first of which, $g'$ is connected with one coating of the storage condenser $e$, and the second $g''$ with the one coating of the ignition condenser $a$ the two directly connected second coatings of the ignition condenser $a$, and of the storage condenser $e$ are connected with the body of the projectile which is shown by a conductor leading to its casing surface.

It may be well at this point to call attention to a special property of the contact lever $g''$. Whereas the contact lever $g'$ is arranged like all the movable contact elements previously described, on the projectile, with reference to having its axis of swing directed rearwardly and spreading out forward and laterally during the movement of the projectile, the contact lever $g''$ is arranged, in the shipping condition, directed forwardly and in order to cooperate with the opposing contact elements $m'$, $m''$ of the charging device on the gun, swings out through a definite angle backward and laterally. This arrangement provides such an excentric position for the center of gravity of the contact lever $g''$ with respect to its axis of swinging, that the turning moment exerted upon the lever by the acceleration of the projectile, upon firing, is directed in the same sense, in its position wherein it produces contact with the contact elements $m'$, $m''$ of the gun, as the turning moment exerted thereon by the centrifugal force. Thereby, upon passing through the contact rings $m'$, $m''$ of the gun, the lever is pushed with particular force against the current-carrying opposing contact surfaces of the rings and certainty is provided for a sufficiently long period of contact for energy transfer without losses, into the igniter. Such an eccentric position of the center of gravity of the contact lever with respect to its axis of swinging could moreover also be attained in the contact levers which are directed rearwardly, by an appropriate distribution of the masses, for example, by providing a counterweight upon a second arm of the contact lever which projects into the body of the igniter, as shown in Figures 18-21. Furthermore this forwardly-directed position of one contact lever $g''$ in combination with the rearwardly-directed position of the second contact lever $g'$, is made use of in solving the problem of introducing the various ignition energies into the proper points in the igniter, as will be made clear by the following explanations.

After leaving the muzzle of the gun R, the contact elements $g'$, $g''$ of the projectile which have already swung out into contact with the walls of the bore, will swing out further radially into the field of the inner surfaces of the contact rings $m'$, $m''$ of the gun which cooperate with them as opposing contact surfaces. The point of the forwardly-directed contact lever $g''$ will first reach the first contact ring $m'$ of the gun. Inasmuch as the rear end of the projectile at this time is still in intimate contact with the bore of the gun R through its guide band $v$, at this time a transfer of energy from the condenser $U_2$, carrying the potential varying from plus to minus 100 volts, into the igniter will take place and at first this voltage is transferred to the storage condenser $e$. Upon the further forward movement of the projectile the forwardly-directed contact lever $g''$ will come into contact with the forward contact ring $m''$ of the gun, upon which exists the constant voltage of 300 volts. Thereby the storage condenser $e$ now receives the voltage which is carried by the charging condenser $U_1$, which is also intended to remain therein finally. At the same instant, or if desired earlier or later, the igniter condenser $a$ is charged to the variable voltage of the charging condenser $U_2$, as now the second rearwardly-directed lever $g'$ comes into contact with the first contact ring $m'$ of the gun, inasmuch as the guide band $v$ of the projectile still remains within the bore of the gun and in contact with the same at the time the two levers $g'$ and $g''$ make contact with the rings $m'$ and $m''$ of the gun (Fig. 23). The two igniter condensers $a$ and $e$ now carry the necessary voltages which are provided for them and which are requisite for obtaining the desired time of ignition. Upon further forward movement of the projectile, the rearwardly-directed contact lever $g'$ of the projectile will also come into contact with the forward contact ring $m''$ of the gun (Fig. 24). This, however, has no effect upon the voltage conditions of the igniter condenser arrangement $e$—$a$, inasmuch as due to the correspondingly great chosen spacing of the contact ring $m''$ from the muzzle of the gun R, the projectile has already entirely left same or is no longer in contact therewith at its tapering rear end. The connection of the igniter condensers to the charging device is therefore now merely a unipolar one, which does not produce any undesired transferring of the energy in the igniter.

Figure 22 also serves to show more clearly how one and the same igniter may be employed for a plurality of different calibers of projectiles. In said figure there are shown in dot and dash lines, a gun barrel of relatively large caliber, a projectile body belonging thereto and contact rings of suitable larger interior diameter; the actual igniter, that is, the igniter body together with the internal arrangements, is the same as for the projectile of smaller caliber, of the outer casing surface of which it forms, in a forward direction, a smooth continuation. For this larger caliber the contact levers $g'$, $g''$ of the projectile, in the position of the projectile illustrated in Figure 22, are shown in a position wherein they are swung out somewhat further, such as is positively produced as a result of the greater diameter of the bore and the greater extent of swinging out of the contact levers which takes place thereby even during the movement of the projectile within the barrel. The contact levers $g'$, $g''$ will therefore have their contact-producing ends extended outwardly in radial direction into the range of the inner surfaces of the gun contact rings $m'$, $m''$ just at the time that they have progressed longitudinally, that is, in the direction of the guide track of the projectile, into the contact rings of the gun. They then operate also with the greater diameter or caliber of the projectile exactly in the same manner as prescribed for the smaller one. In order to make it possible to use the ingniters without any changes whatever therein for a plurality of different calibers of projectiles, the movable contact levers $g'$, $g''$ are arranged to be capable of swinging out so so far that they will still be able to reach the opposing contact rings $m'$, $m''$ of the largest intended gun caliber. The apparently present possibility that with the projectiles of smaller caliber the forwardly-directed contact lever $g''$ might become jammed as a result of a premature excessive swinging-out with its point against the rear end surface of the first contact ring $m'$ of the gun or even the second ring $m''$, is removed by a suitable arrangement and dimensioning of the length of the lever as well as by the formation of the inner surface of the rings in combination with their spacing from the muzzle of the bore. With the ordinary construction of rifling of the gun barrel the radial swinging-out of the ends of the contact levers of the projectile actually amounts to only a few millimeters for a forward movement of the projectile of several centimeters, so that with a slightly conical formation of the inner casing surface of the contact rings $m'$, $m''$ of the gun, the ends of the contact levers $g'$, $g''$ of the projectile will, considered as a slow-motion picture, slowly move in a radial direction against the inner casing surface of the contact rings $m'$, $m''$ and during passing will smoothly set upon the same. Then also no resulting inward swings will be produced due to any rebounding effect, which would possibly allow the contact lever $g''$ to pass through the forward contact ring $m''$ of the gun without producing contact with the inner surface thereof. A relatively greater dimensioning of the length of the central contact element $m'$ of the gun in the direction of the track of the projectile than shown in the merely diagrammatic figures, will therefore be advantageous in practice.

In the embodiment in accordance with Fig. 25, the barrel R is at a voltage lying between plus and minus 100 volts, the middle contact ring $m'$ of the gun is at zero potential and the forward contact ring $m''$ of the gun is at a voltage of plus 300 volts. The pair of charging contacts on the projectile for the storage condenser $e$ thereof consists of the two movable contact levers $g'$, $g''$, the pair of charging contacts for the ignition condenser $a$ consists of the contact lever $g'$ and the guide ring $v$ of the projectile. The charging procedure thereby proceeds in that after the first production of contact of the lever $g''$ against the ring $m'$ of the gun, which, in cooperation with the abutting of $v$ against R produces a charging of the igniter condensers $e$ and $a$ from the charging condenser $U_2$ in inverse proportion to their capacities for instance, the capacity $e$ may be the triplicate of the capacity $a$ in the position of the projectile illustrated in Fig. 25, the storage condenser $e$ is provided from the charging condenser $U_1$ with a voltage of plus 300 volts and simultaneously the ignition condenser $a$ is provided from the second charging condenser $U_2$ with the voltage carried by the latter and lying between plus and minus 100 volts. If then the rearwardly-directed contact lever $g'$ enters into the forward contact ring $m''$ of the gun, then the rear end of the projectile has already left the muzzle of the gun at the front and now only a unipolar, inoperative, contact of the igniter condenser arrangement with the charging device will take place.

In the embodiment in accordance with Fig. 26 having the voltage of plus 300 volts at the muzzle of the gun R, a voltage lying between plus and minus 100 volts at the central contact ring $m'$ of the gun and a zero potential at the forward ring $m''$, the storage condenser $e$ of the igniter is first charged, by the production of contact between $g''$ and $m'$ and the simultaneously occurring contacts between $v$ and R, to the difference of voltage existing between the two charging condensers $U_1$ and $U_2$. Thereupon, in the position of the projectile illustrated in the drawing, wherein contacts are produced simultaneously between $g''$ and $m''$, $g'$ and $m'$ and $v$ and R, a supplemental charging of the storage condenser $e$ occurs to supply the amount still lacking to plus 300 volts, whereas the ignition condenser $a$ is charged to the voltage of the charging condenser $U_2$ which is variable between plus and minus 100 volts. In this case also the passage of the contact lever $g'$ of the projectile through the forward contact ring $m''$ of the gun has no effect upon the preceding charging of the igniter.

I claim as my invention:

1. In a contact device for transferring electrical energy into projectile igniters from a charging arrangement having current-carrying opposing contact elements which are located laterally of the track of the projectile and which is transiently connected to the igniters, current-receiving contact elements on the projectile which are movable thereon transversely to the axis of the said projectile and which yieldably enter into the field of the said current-carrying opposing contact elements of the charging arrangement.

2. A device in accordance with claim 1 wherein the contact elements on the projectile, in the shipping condition of the said projectile are located in holes or cavities of the body of the projectile so as to lie within the outer surface thereof, and automatically extend forward into their contact-producing position cooperating with the opposing contact elements of the charging device due to mechanical forces produced only upon and by the firing-off of the projectile.

3. A device in accordance with claim 1 including also safety means and wherein the contacts of the projectile, in their shipping position lie against or within the surface of the projectile and are automatically secured against extending outward into their contact-producing positions by said safety means and devices for automatically releasing said safety means by forces produced upon and by the firing-off of the projectile.

4. A device in accordance with claim 1 wherein the contact elements on the projectile, in the shipping condition of the said projectile are located in holes or cavities of the body of the projectile so as to lie within the outer surface thereof, and automatically extend forward into their contact-producing position cooperating with the opposing contact elements of the charging device due to mechanical forces produced only upon and by the firing-off of the projectile and means for automatically returning the projectile contacts into their shipping position after they have passed the opposing contact elements of the charging device.

5. A device in accordance with claim 1 wherein the contact elements on the projectile, in the shipping condition of the said projectile are located in holes or cavities of the body of the projectile so as to lie within the outer surface thereof, and automatically extend forward into their contact-producing position cooperating with the opposing contact elements of the charging device due to mechanical forces produced only upon and by the firing-off of the projectile and a switch cooperating with a contact element of the projectile, said projectile containing an igniter comprising an energy-carrier, an electrical circuit including the said contact and the energy-carrier, said switch being interposed in said circuit and being controlled by the contact element, whereby the said contact element causes the energy-carrier to be disconnected from the contact element when the latter is in its shipping position.

6. A device in accordance with claim 1 wherein the contact elements on the projectile, in the shipping condition of the said projectile are located in holes or cavities of the body of the projectile so as to lie within the outer surface thereof, and automatically extend forward into their contact-producing position cooperating with the opposing contact elements of the charging device due to mechanical forces produced only upon and by the firing-off of the projectile and a switch cooperating with a contact element of the projectile, said projectile containing an igniter comprising an energy-carrier, an electrical circuit including the said contact and the energy-carrier, said switch being interposed in said circuit and being positively connected to the contact element, whereby the said contact element causes the switch to be closed when it is shifted from its shipping position into its current-receiving position.

7. A device in accordance with claim 1 wherein the contact elements on the projectile, in the shipping condition of the said projectile are located in holes or cavities of the body of the projectile so as to lie within the outer surface thereof, and automatically extend forward into their contact-producing position cooperating with the opposing contact elements of the charging device, due to mechanical forces produced only upon and by the firing-off of the projectile and a switch cooperating with a contact element of the projectile, said projectile containing an igniter comprising an energy-carrier, an electrical circuit including the said contact and the energy-carrier, said switch being interposed in said circuit and being positively connected to the contact element, whereby the said contact element causes the switch to be closed when it is shifted from its shipping position into its current-receiving position, said contact element being capable of passing through a central position wherein its outer end has entered into the path of the opposing contact element of the charging device and simultaneously by closing the switch controlled thereby is connected through the energy-carrier of the igniter, and can extend out of the body of the igniter into an outer end position, in which it is disconnected from the energy-carrier by again opening the switch.

8. In a contact device for transferring electrical energy into projectile igniters from a charging arrangement having current-carrying opposing contact elements which are located laterally of the track of the projectile and which is transiently connected to the igniters, at least one current-receiving contact element on the projectile which is mounted to swing thereon transversely to the axis of the said projectile and which yieldably enters into the field of the said current-carrying opposing contact elements of the charging arrangement, the axis of swing of the said swinging element of the projectile being inclined through the angle of rifling of the gun to the longitudinal axis of the projectile so that the said contact element itself is arranged to extend in the direction of the surface travel of the projectile when being fired from the gun.

9. A device in accordance with claim 8 wherein the contact elements of the projectile are levers which swing outward by the action of centrifugal force and have such excentric positions of their centers of gravity with respect to the axes of swinging that the turning moments exerted on the contact elements by the acceleration of the projectile upon firing are directed in the same senses as the turning moments produced by the centrifugal forces thereon, in their contact producing positions with their corresponding opposing contact elements of the charging device arranged on the gun.

10. A device in accordance with claim 8 wherein the contact elements of the projectile are levers which swing outward by the action of centrifugal force and have such excentric positions of their centers of gravity with respect to the axes of swinging that the turning moments exerted on the contact elements by the acceleration of the projectile upon firing are directed in the same senses as the turning moments produced by the centrifugal forces thereon, in their contact-producing positions with their corresponding opposing contact elements of the charging device arranged on the gun, said levers, when the projectile is in its shipping condition, extending forwardly thereof and being capable of cooperating with the opposing contacts of the charging arrangement, located on the gun, by spreading out rearwardly and laterally upon firing.

11. A device in accordance with claim 8 wherein, upon the projectile, there are present contact levers which spread outward laterally and forwardly upon firing of the projectile and which are directed rearwardly in the shipping condition and also other contact levers which in the shipping condition are directed forwardly and upon said firing of the projectile spread out laterally and rearwardly.

12. A device in accordance with claim 1 wherein the current-conducting contact elements of the charging arrangement are rings which are themselves rigid and arranged in front of the muzzle of the gun from which the projectile, which in positive connection with said gun, whose inner surfaces cooperate with the contact elements of the projectile which passes through them, to form cooperating opposing contact surfaces.

13. In a contact device for transferring electrical energy from a gun into projectile igniters from a charging arrangement having current-carrying opposing contact elements which are located on said gun laterally of the track of the projectile and which is transiently connected to the igniters, at least one current-receiving contact element on the projectile which is mounted to swing thereon transversely to the axis of the said projectile and which yieldably enters into the field of the said current-carrying opposing contact elements of the charging arrangement, the current conducting contact elements of the charging arrangement being rings which are themselves rigid and arranged in front of the muzzle of the gun and in rigid connection with said gun, whose inner surfaces cooperate with the contact elements of the projectile which passes through them, to form cooperating opposing contact surfaces, intermediate layers of insulating material which connect one of the contact rings with the gun and are spaced radially out of the direct field of the stream of gas discharging from the muzzle of the gun and protective projections provided on the contact ring and the insulating layer portions which in combination with perforations forming gas discharge passages provided in these parts, prevent any injurious pressure action of the propelling gases upon the intermediate insulating layers.

14. A device in accordance with claim 13 wherein the contact rings of the charging device are clamped so as to be capable of being centered with respect to the bore of the gun between two retaining elements arranged in front of the muzzle of the gun and surrounding them and their insulation.

15. A device in accordance with claim 1 wherein the igniter comprises a plurality of energy-carriers and wherein, in order to introduce various energies simultaneously into said plurality of energy-carriers a plurality of the movable projectile contact elements cooperate with the opposing contact elements by yieldably entering into their fields.

16. A device in accordance with claim 1 wherein the igniter comprises a plurality of energy-carriers and a plurality of opposing contact members of the charging device arranged with their contact surfaces at various spacings transverse to the guide track of the projectiles so as to follow one another stepwise in the longitudinal direction of the guide track of the projectile in such manner that the projectile upon passing by them first reaches the one lying nearest the guide track of the projectile in a transverse direction and that this opposing contact element carries the weakest energy, and that the others which are placed at successively greater distances, carry the stronger energies.

17. A device in accordance with claim 1 wherein the projectile has a number of current-receiving contact elements corresponding to the number of current-carrying opposing contact elements of the charging device, each of which corresponds to one of the opposing contact elements of the charging device and which conducts energy carried by the latter into the igniter.

18. A device in accordance with claim 1 wherein the projectile has a number of current-receiving contact elements corresponding to the number of current-carrying opposing contact elements of the charging device, each of which corresponds to one of the opposing contact elements of the charging device and which conducts energy carried by the latter into the igniter and wherein each of the current-receiving contact elements is arranged to be movable to such limited extent out of the projectile that upon passing the opposing contact elements of the charging device that one makes contact as the final one which carries the energy which is to be introduced thereby into the igniter.

19. A device in accordance with claim 1 wherein the projectile has a number of current-receiving contact elements corresponding to the number of current-carrying opposing contact elements of the charging device, each of which corresponds to one of the opposing contact elements of the charging device and which conducts energy carried by the latter into the igniter and wherein each of the current-receiving contact elements is arranged to be movable to such limited extent out of the projectile that upon passing the opposing contact elements of the charging device that one makes contact as the final one which carries the energy which is to be introduced thereby into the igniter, and energy carriers and switches arranged in current supply conductors leading from the contacts to the energy-carriers of the ignition, the movable contacts of the projectile being positively connected with said switches, and each arranged to close the corresponding switch only in the position wherein it makes contact with that opposing contact element of the charging device which carries the energy which is to be introduced thereby into the igniter.

20. A device in accordance with claim 13 wherein the introduction of various kinds of energy into an igniter is accomplished by means of a single movable contact element on the projectile, which in positive connection with switches lying in the current conductors leading from it to the energy-carriers of the igniter, comes successively into contact with all the opposing contact elements of the charging device and at each individual contacting in each case is in connection with that energy-carrier of the igniter which is to be supplied precisely with the energy carried by the contacted opposing contact elements.

21. A device in accordance with claim 13 comprising a plurality of current-carrying contact elements on the gun and a plurality of current-receiving movable contact elements of the projectile cooperating therewith said contact elements being arranged successively in their supports upon the gun and upon the projectile at such spacings that each pair of contacts on the projectile corresponding to an energy-carrier in the projectile, and connected to the two poles thereof, finally comes into simultaneous connection with that pair of contacts on the gun that carries the energy intended for the energy-carrier in question of the projectile, whereas the gun contact elements lying further forward are brushed past while giving only a single contact, and thereby through subsequent merely unipolar contacts of the energy-carrier of the igniter with the source of charging current, the previously acquired energy of an energy-carrier remains unchanged.

22. A device in accordance with claim 13 comprising a plurality of current-carrying contact elements on the gun and a plurality of current-receiving movable contact elements of the projectile cooperating therewith said contact elements being arranged successively in their supports upon the gun and upon the projectile at such spacings that each pair of contacts on the projectile corresponding to an energy-carrier in the projectile, and connected to the two poles thereof, finally comes into simultaneous connection with that pair of contacts on the gun that carries the energy intended for the energy-carrier in question of the projectile, whereas the gun contact elements lying further forward are brushed past while giving only a single contact, and thereby through subsequent merely unipolar contacts of the energy-carrier of the igniter with the source of charging current, the previously acquired energy of an energy-carrier remains unchanged, the contact elements on the gun being rings of equal internal diameters.

23. A device in accordance with claim 13 comprising a plurality of current-carrying contact elements on the gun and a plurality of current-receiving movable contact elements of the projectile cooperating therewith said contact elements being arranged successively in their supports upon the gun and upon the projectile at such spacings that each pair of contacts on the projectile corresponding to an energy-carrier in the projectile, and connected to the two poles thereof, finally comes into simultaneous connection with that pair of contacts on the gun that carries the energy intended for the energy-carrier in question of the projectile, whereas the gun contact elements lying further forward are brushed past while giving only a single contact, and thereby through subsequent merely unipolar contacts of the energy-carrier of the igniter with the source of charging current, the previously acquired energy of an energy-carrier remains unchanged, there being two current-carrying contact elements on the gun in front of the muzzle of the gun, which is likewise connected to the source of charging current to act as a charging pole for projectile igniters with unipolar connection through the body thereof to their energy-carriers, wherein the forward contact element of the gun is arranged at a greater distance in front of the muzzle of the gun than the distance of the contact-producing end portion of that contact element of the projectile which has come out of contact with the contact of the gun barrel from the portion of the rear end of the projectile which last is in contact with the muzzle of the gun and than the distance of the second pole of that energy-carrier of the projectile for which the energy carried by the forward contact element of the barrel is not intended.

24. In a contact device for transferring electrical energy into projectile igniters from a charging arrangement having current-carrying means located laterally of the path of the projectile and which is transiently connected to the igniters, current-receiving means on the projectile movable thereon transversely to the axis of the projectile, said current-receiving means yieldably entering into the field of the current-carrying means of the charging arrangement.

25. An electrical energy transferring means from a charging source into a projectile, igniter comprising current-carrying means for the charging source arranged in the path of the projectile, and current-receiving means yieldably mounted on the projectile and adapted to enter into the field of the current-carrying means.

26. An electrical energy transferring means from a charging source into a projectile igniter, comprising current-carrying means for the charging source arranged laterally in the path of the projectile, and current-receiving means movable on the projectile transversely to the axis of the projectile and yieldably entering into the field of the current-carrying means of the charging source.

In testimony whereof, I affix my signature.

HERBERT RÜHLEMANN.